UNITED STATES PATENT OFFICE.

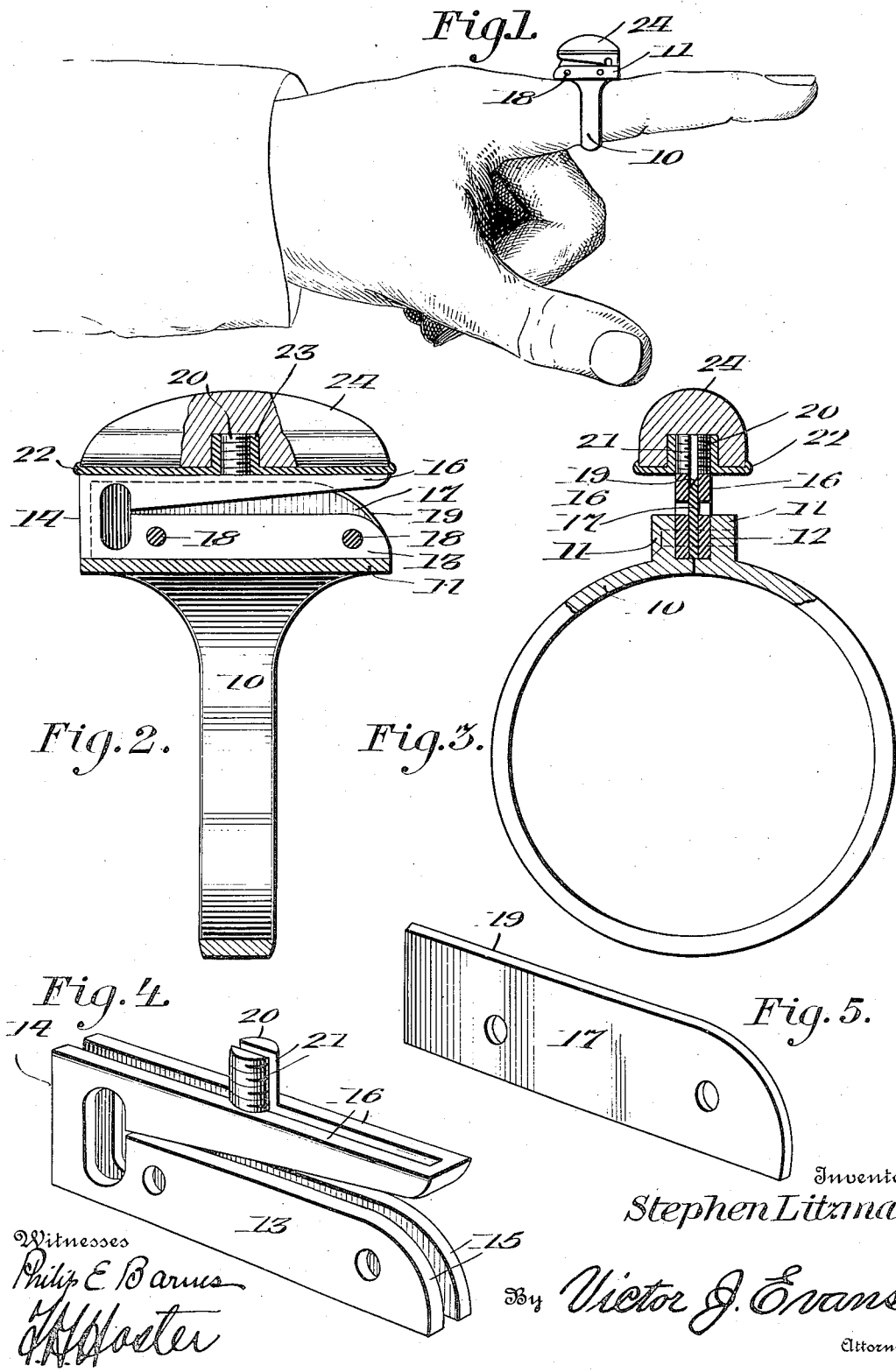

STEPHEN LITZMAN, OF ERIE, PENNSYLVANIA.

TWINE-CUTTER.

1,060,773. Specification of Letters Patent. Patented May 6, 1913.

Application filed June 4, 1912. Serial No. 701,590.

*To all whom it may concern:*

Be it known that I, STEPHEN LITZMAN, a subject of the Czar of Russia, residing at Erie, in the county of Erie and State of Pennsylvania, have invented new and useful Improvements in Twine-Cutters, of which the following is a specification.

An object of the invention is to provide a device for cutting twine.

The invention embodies, among other features, a device that is preferably mounted on one of the fingers and conveniently positioned thereon so that when twine is engaged with the device the twine will be quickly and easily severed, the device being preferably made in an ornamental shape and artistically designed to present a neat and effective appearance, similar to that of a ring.

In the further disclosure of the invention reference is to be had to the accompanying drawings constituting a part of this specification, in which similar characters of reference denote corresponding parts in all the views, and in which:

Figure 1 is a perspective view showing my device in applied position; Fig. 2 is a vertical longitudinal sectional view; Fig. 3 is a vertical transverse sectional view; Fig. 4 is a perspective view of the pressure cutting member; and Fig. 5 is a perspective view of the blade.

Referring more particularly to the views, I employ a ring 10, the said ring being preferably made of a shape and design similar to an ordinary finger ring and adapted to be placed upon the finger as shown in Fig. 1, the mentioned ring 10 being provided with a head 11 having a recess 12 therein and in which is mounted a casing 13 formed with a pressure member 14, the said pressure member being preferably formed of a single piece of material stamped to form lower spaced portions 15, constituting the casing 13, and upper forwardly extending spaced portions 16 of a resilient or spring-like nature, the mentioned forward ends of the portions 16 being spaced from the forward ends of the portions 15 to form a suitable opening, the said forward portions being preferably curved so that the extremities thereof will form guideways for the twine when the twine is passed between the portions 15 and the portion 16. A blade 17 is mounted in the casing 13, between the portions 15, suitable screws 18 being mounted to extend transversely through the head 11, the portions 15 and the blade 17 to rigidly secure the blade to the pressure member 14 and also secure the pressure member to the head 11, the beveled or sharpened edge 19 of the blade being adapted to extend upwardly beyond the upper edges of the portions 15 of the pressure member 14 as shown in Fig. 3.

A threaded shank 20 is formed with the pressure member 14, the said shank consisting preferably of similar portions 21 formed on the upper edges of the portions 16 and extending upwardly into a plate 22, preferably formed of stamped material and provided with an upwardly struck portion 23 in which the shank 20 is threadedly received, a cap 24, preferably a jewel or stone of a fancy design, being cemented or otherwise secured to the plate 22 as shown in Figs. 2 and 3.

In the use of my device, the ring 10 is mounted on the finger as shown in Fig. 1 and when it is desired to cut a piece of twine, the twine is received between the portions 15, constituting the casing 13, and the portions 16, constituting the upper part of the pressure member 14, thus pressing the upper part of the pressure member upwardly, it being readily seen that the spring-like nature of the pressure member will result in a continuous downward pressure on the spring-like member when the same is displaced by drawing the twine into the space between the portions 15 and the portions 16, the twine being simply severed by releasing the tension thereon. It will be readily understood that the operation of cutting the twine requires but an instant and that by having the device mounted on the finger as mentioned, the twine can be readily severed after the hands have been employed to tie a package or the like.

Having thus described my invention, I claim:

1. As a new article of manufacture, a ring, a recessed head formed therewith, an integral pressure member, a blade mounted in the pressure member, screws for securing the pressure member to the said head and the said blade to the said pressure member, a plate on the said pressure member, and a cap on the said plate, the upper portions of the said pressure member being of a resilient nature and normally spaced from the said blade.

2. In a device of the class described, the combination with a ring, of a head thereon, a pressure member secured to the said head, a casing formed with the said pressure member, a blade secured in the said casing and normally spaced from the upper portions of the pressure member, a plate having threaded connection with the said pressure member, and a cap secured to the said plate.

3. In a device of the class described, the combination with a ring, of a head thereon, a pressure member formed of a single piece of material and mounted in a recess in the said head, screws mounted to pass through the said head and the pressure member to secure the said pressure member to the head, a blade rigidly secured in spaced portions of the pressure member, a threaded shank formed with the pressure member, a plate on the said shank, and a cap on the said plate.

In testimony whereof I affix my signature in presence of two witnesses.

STEPHEN LITZMAN.

Witnesses:
ANDRE WARKI,
LORENZ STACHOWSKI.